(12) United States Patent
Wilkinson et al.

(10) Patent No.: US 6,722,228 B1
(45) Date of Patent: Apr. 20, 2004

(54) FLYWHEEL AND METHOD AND APPARATUS FOR MANUFACTURING FLYWHEELS

(76) Inventors: Curt Wilkinson, 911 Stratford Ave., Elkins Park, PA (US) 19027; Joseph Francis Celotto, 56 Cassella Dr., Hamden, CT (US) 06514

( * ) Notice: Subject to any disclaimer, the term of this patent is extended or adjusted under 35 U.S.C. 154(b) by 0 days.

(21) Appl. No.: 10/034,947

(22) Filed: Dec. 28, 2001

Related U.S. Application Data (60) Provisional application No. 60/258,330, filed on Dec. 28, 2000.

(51) Int. Cl.⁷ .............................. G05G 1/00; G05G 3/00
(52) U.S. Cl. .......................................... 74/572; 264/257
(58) Field of Search ...................... 74/572–574; 29/894, 29/894.2; 264/257

(56) References Cited

U.S. PATENT DOCUMENTS

| | | | |
|---|---|---|---|
| 4,080,845 A | 3/1978 | Hatch | 74/572 |
| 4,207,778 A | 6/1980 | Hatch | 74/572 |
| 4,285,251 A | 8/1981 | Swartout | 74/572 |
| 4,660,435 A | 4/1987 | Davis et al. | 64/573 |
| 4,819,456 A | 4/1989 | Guell | 66/135 |
| 4,860,611 A | 8/1989 | Flanagan et al. | 74/574 |
| 4,911,158 A | 3/1990 | Weatherly | 606/107 |
| 4,996,016 A | 2/1991 | Wall | 264/229 |
| 5,237,855 A | 8/1993 | Gates | 73/45.5 |
| 5,275,020 A | 1/1994 | Scherzinger | 66/27 |
| 5,285,699 A | 2/1994 | Walls et al. | 74/572 |
| 5,327,747 A | 7/1994 | Aria | 66/57 |
| 5,452,625 A | 9/1995 | Nardone et al. | 74/572 |
| 5,566,588 A | 10/1996 | Bakholdin et al. | 74/572 |
| 5,568,738 A | 10/1996 | Wang | 66/222 |
| 5,590,563 A | 1/1997 | Kuwahata et al. | 74/337.5 |
| 5,590,569 A | 1/1997 | Nardone et al. | 74/572 |
| 5,613,375 A | 3/1997 | Renda et al. | 66/8 |
| 5,628,232 A | 5/1997 | Bakholdin et al. | 74/572 |
| 5,689,977 A | 11/1997 | Yorisue et al. | 66/219 |
| 5,692,414 A | 12/1997 | Gregoire | 74/572 |
| 5,695,584 A | 12/1997 | Gregoire | 156/169 |
| 5,728,403 A | 3/1998 | Mauger et al. | 424/486 |
| 5,760,506 A | 6/1998 | Ahlstrom et al. | 310/74 |
| 5,778,736 A | 7/1998 | Maass et al. | 74/572 |
| 5,784,926 A | 7/1998 | Maass | 74/572 |
| 5,881,571 A | 3/1999 | Reester | 66/54 |
| 5,969,457 A | 10/1999 | Clifton et al. | 310/216 |
| 6,012,911 A | 1/2000 | Hirooka | 418/55.5 |
| 6,014,911 A | 1/2000 | Swett | 74/572 |
| 6,016,670 A | 1/2000 | Kuhrau et al. | 66/152 |
| 6,029,350 A * | 2/2000 | Maass et al. | 29/894 |
| 6,122,993 A | 9/2000 | Morris et al. | 74/572 |
| 6,138,527 A | 10/2000 | Bitterly et al. | 754/572 |
| 2003/0000336 A1 * | 1/2003 | Tsai | 74/572 |
| 2003/0049429 A1 * | 3/2003 | Spears et al. | 428/293.1 |

FOREIGN PATENT DOCUMENTS

EP 0794352 A2 * 9/1997 .................. 74/572

* cited by examiner

*Primary Examiner*—Vinh T. Luong
(74) *Attorney, Agent, or Firm*—Knoble Yoshida & Dunleavy LLC (57) ABSTRACT

An apparatus and method for the manufacture of composite flywheels. The apparatus includes an inner cylinder, an outer cylinder, a fiber feeding device and a knitting device. The fiber feeding device includes a set of conical feed rollers for feeding hoop fibers to the cylinders. The knitting device employs a circular knitting machine fitted with a radial fiber guide for feeding the radial fibers to the cylinders. The apparatus also includes structure for raising and lowering the needles of the knitting machine at the proper times to effectively feed the radial fibers to the cylinders. The fiber feeding device and knitting device interact to provide layers of hoop and radial fibers to the cylinders to form a flywheel pre-form including a combination of radial and hoop fibers without introducing crimp into the fibers.

12 Claims, 9 Drawing Sheets

FIG. 10

FLYWHEEL AND METHOD AND APPARATUS FOR MANUFACTURING FLYWHEELS

This application claims the benefit of Provisional application Ser. No. 60/258,330 filed Dec. 28, 2000.

BACKGROUND OF THE INVENTION

1. Field of the Invention

The invention relates to fly wheels for energy storage and methods and apparatus for making such flywheels. More particularly, the invention relates to a fiber composite flywheel and a method and apparatus for making it wherein the fiber composite flywheel includes a combination of spiral fibers in the hoop direction with radial fibers in order to optimize strength and stress properties.

2. Brief Description of the Prior Art

A flywheel is a device for storing energy or momentum in a rotating mass. Large engines require a heavy rotating mass to carry them smoothly through pauses between jerky piston strokes. Automobile engines today have smaller flywheels that perform the same essential task of storing energy. Flywheels convert electrical energy to kinetic energy, and the more energy put into the flywheel, the faster it spins. Increasing a flywheel's speed increases its energy density, or the amount of energy that can be stored and recovered per unit weight; thereby increasing the efficiency and cost effectiveness of the flywheel.

The strength to density ratio of the material used in a flywheel rotor is critical. Carbon fiber composites are preferred for high performance flywheels because of their high strength and low density. A denser material has more moss packed into a given volume and kinetic energy for a given speed increases with mass. Steel is denser than carbon fibers, so steel molecules have more energy than fiber molecules when they are moving at the same speed.

To maximize the energy storage of a flywheel, it is generally desirable to maximize the ratio of strength (s) to density (r). This ratio (s/r) makes it easy to compare the energy storing potential of different materials. For steel, s/r is at most 966,000. Carbon fibers have a higher tensile strength, up to 1 million psi, and a much lower density, around 0.06 lbs/in$^3$. For these fibers, s/r is 17 million, about 17 times better than steel. This means that although carbon fiber is only 3.6 times stronger than steel, it can store almost 17 times more energy per pound.

Another advantage of fiber-reinforced composite rotors, as compared to metallic rotors, is that they have been shown to fail in a less destructive manner than metallic rotors—an important factor for safety reasons. Composites offer benign failure modes, which must be considered when addressing flywheels. Other flywheel materials such as steel or ceramics fail by rupturing into large high-energy fragments, which must be contained with shielded canisters. Composites, on the other hand, fail by radial delamination or disintegration, thereby resulting in ejection of short fibers and small matrix particles. This potentially allows for lighter containment vessels to ensure their safety.

One method for making composite flywheels is the cross-ply method. A cross-ply composite flywheel is made from circular shapes cut from a flat woven material. Each layer of material is laid down differently, so that the angles of the fibers are different relative to one another, in order to simulate an isotropic material, like steel. The resulting flywheels are less than ideal. An example of the cross-ply method is shown in U.S. Pat. No. 4,102,221.

Another method for making composite flywheels is filament winding. The filament winding process takes bundles of fibers, dips the fibers in a resin bath, then continuously winds the flywheel from the inner diameter to the outer diameter with larger and larger concentric rings of circumferential fibers. The advantage of filament winding is the speed of manufacture. The disadvantage of a filament winding system is the lack of radial fibers in the final product. Filament wound flywheels with no radial reinforcements fail prematurely as the radial stresses encountered in use create delaminations between the concentric rings of circumferential fibers. The individual rings of fiber stretch at different rates, opening space between the rings and stressing the epoxy filler. U.S. Pat. No. 4,285,251 shows an example of a filament winding process.

Another method for the manufacture of composite flywheels is polar weaving. Polar weaving involves the interlacing of two sets of yarns, warp and weft, and using a special take-up system to advance the outer diameter yarns at a higher rate than the inner diameter yarns to form a circle. The take-up rollers are changed from a straight cylinder to a conical shape. The result is a spiral woven material. When continuously-woven, the plies of material will spiral on top of each other to create a disk.

The primary disadvantages of the polar weaving process are that it is a slow process and the interlacing of the yarns creates crimp in the fiber, which reduces the tenacity (strength) of the fiber and reduces the maximum fiber volume in the flywheel. Crimp reduces the mechanical properties of the fiber because the molecules in the fiber are no longer aligned with the stresses. Also, when the fibers are crimped, the mechanical properties are drastically reduced, particularly when the material is fatigued. U.S. Pat. No. 6,029,350 provides an example of the polar weaving process.

U.S. Pat. No. 5,778,736 describes a fiber composite flywheel having hoop fibers and radial fibers interwoven with the hoop fibers. However, the flywheel design of this patent suffers from the disadvantage that the interwoven radial fibers are crimped in the manufacturing process thereby detracting from their physical and mechanical properties.

SUMMARY OF THE INVENTION

In a first aspect, the present invention relates to an apparatus for the manufacture of composite flywheels. The apparatus includes an inner cylinder, an outer cylinder, a fiber feeding device and a knitting device. The fiber feeding device includes at least a set of conical feed rollers for feeding hoop fibers to the cylinders. The knitting device employs a circular knitting machine fitted with a radial fiber guide for feeding the radial fibers to the cylinders. The apparatus also includes structure for raising and lowering the needles of the knitting machine at the proper times to effectively feed the radial fibers to the cylinders. The fiber feeding device and knitting device interact to provide layers of hoop and radial fibers to the cylinders to form a flywheel pre-form including a combination of radial and hoop fibers without introducing crimp into the fibers.

In a second aspect, the present invention relates to a method for the manufacture of composite flywheels. In the method, a coil of spiral fibers is made in the form of a pre-form. During the step of making the coil of spiral fibers, radial fibers are interleaved with the spiral fibers to provide additional reinforcement in the radial direction. The radial fibers are interleaved as a layer between successive layers of hoop fibers to avoid introducing crimp into the radial and/or hoop fibers during the manufacturing process.

In a third aspect, the present invention relates to a fiber composite flywheel having excellent physical properties. More particularly, the fiber composite flywheel of the present invention includes a coil of spiral fibers interleaved with radial fibers to provide excellent strength and stress properties. One advantage of the invention is that the radial fibers are interleaved with the hoop fibers without crimp in the radial fibers thereby avoiding the disadvantages associated with fiber crimp.

DETAILED DESCRIPTION OF THE PREFERRED EMBODIMENTS

Figure 2:
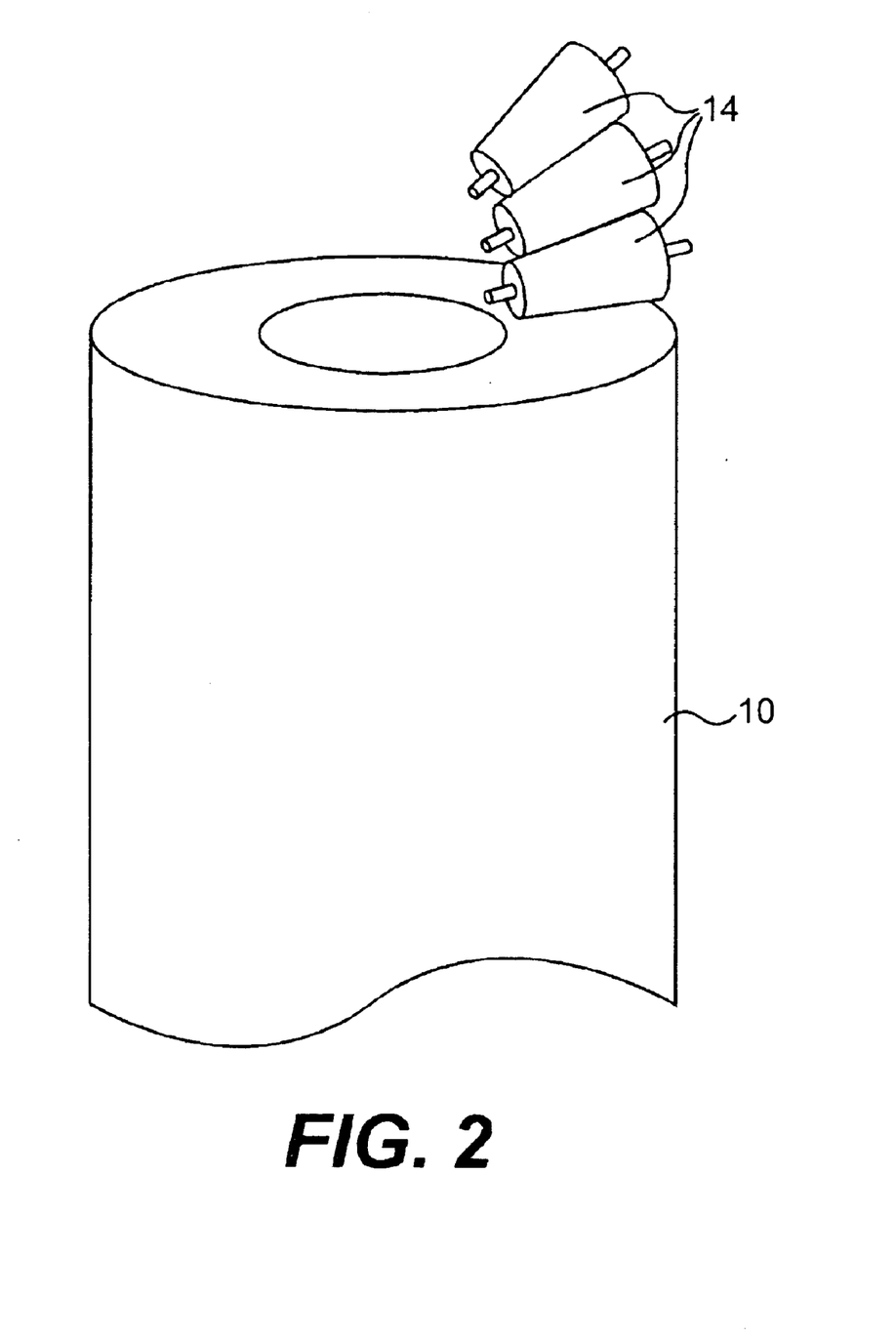
FIG. 2 is a perspective view of a flywheel pre-form of the present invention that shows the position of the conical feed rollers relative to the pre-form during the manufacturing process.

The fiber composite flywheel of the present invention is made from a flywheel pre-form 10 shown in FIG. 2 that is formed from a fiber composite. The flywheel pre-form 10 includes a combination of hoop fibers 15 and radial fibers 16 to provide excellent strength and stress properties to the composite flywheel of the invention.

Figure 3:
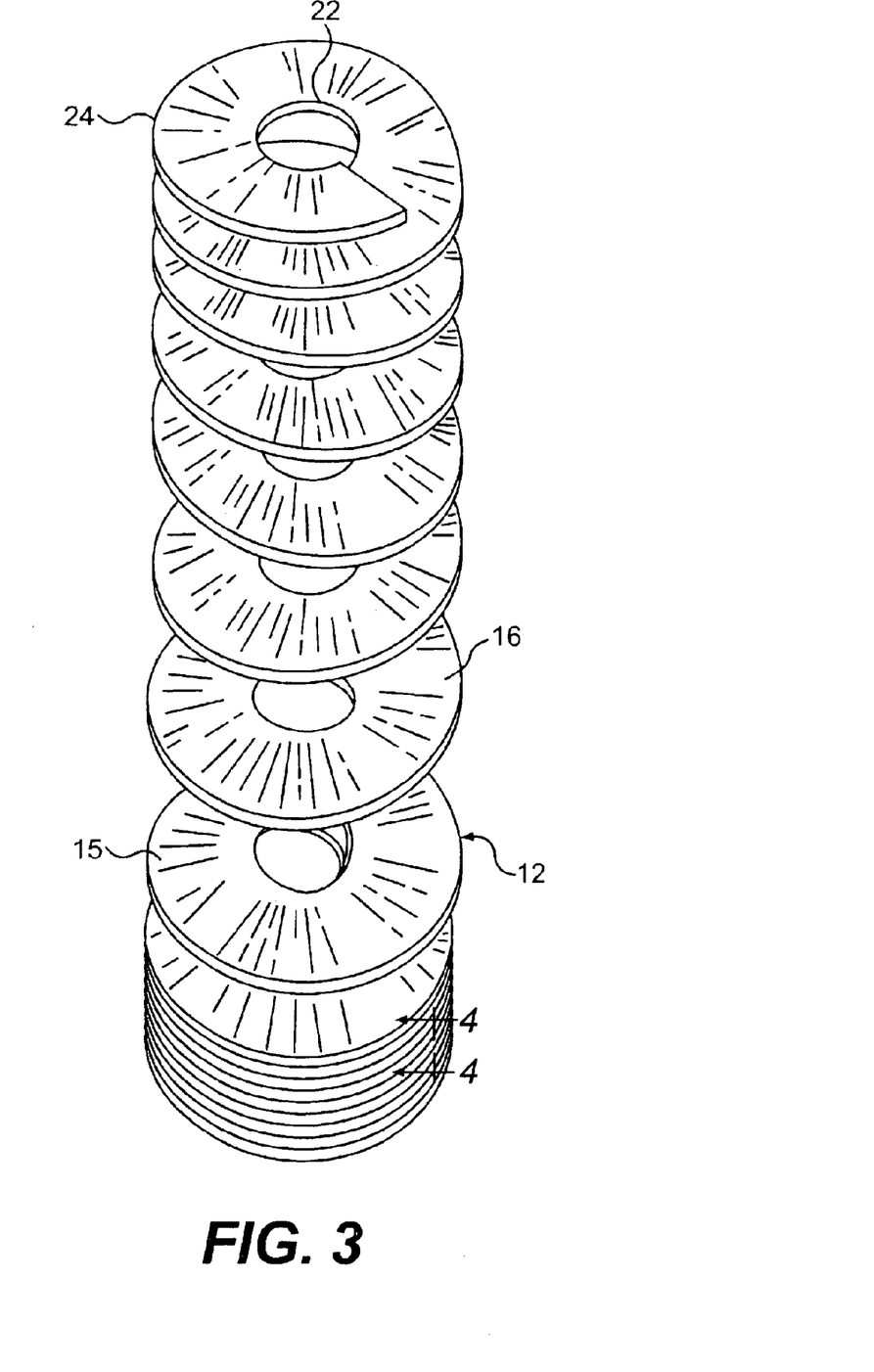
FIG. 3 is a perspective view of a spiral helix of hoop fibers that is formed by the conical feed rollers using the manufacturing process of the invention.
Figure 4:
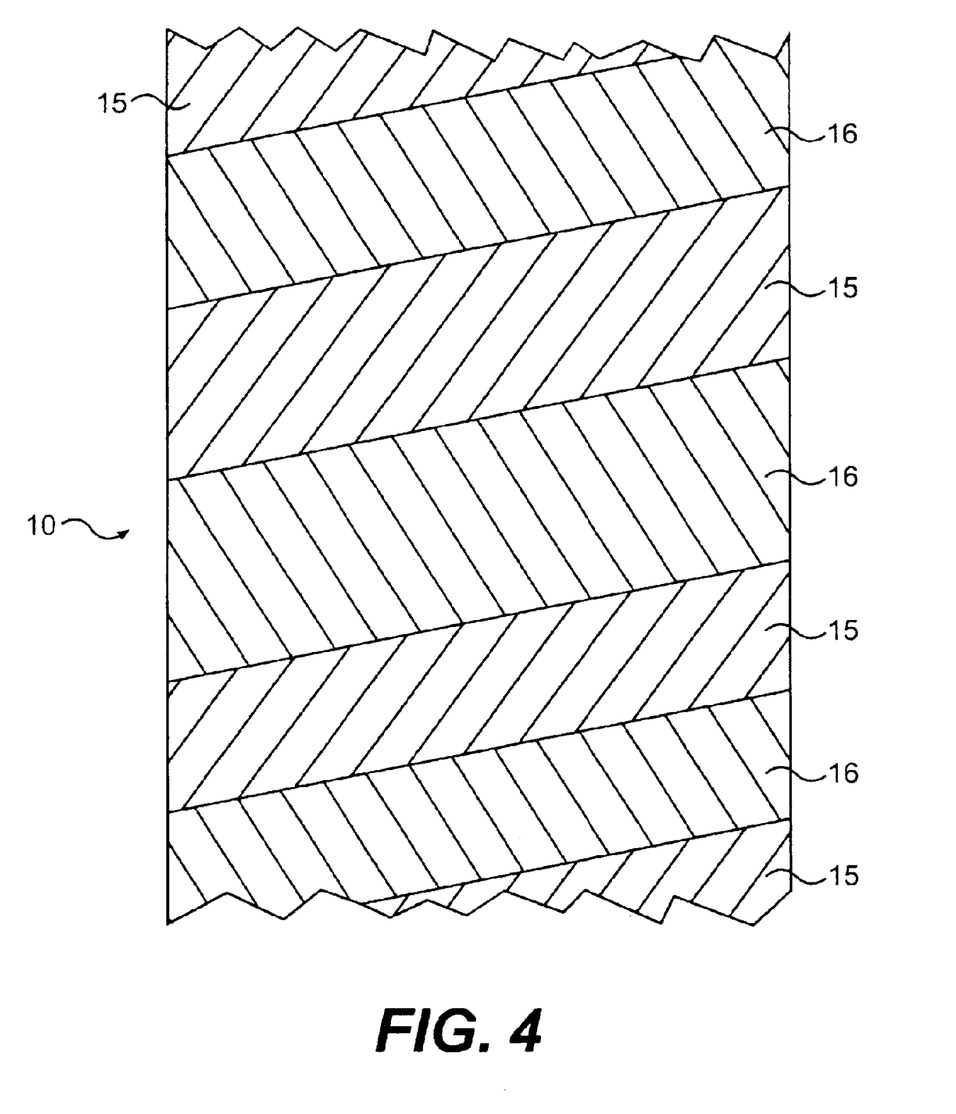
FIG. 4 is a vertical cross-sectional view of the flywheel pre-form shown in FIG. 3 including a combination of spiral hoop fibers and radial fibers in accordance with the present invention.
Figure 5:
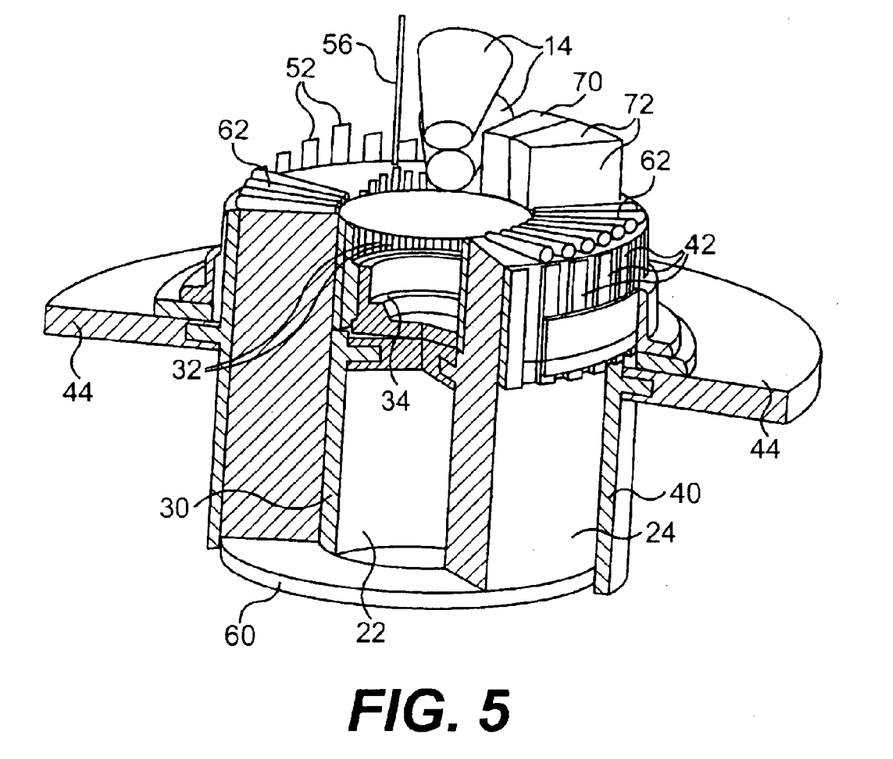
FIG. 5 is a partial cut-away view of the inner and outer cylinders and take-up of the apparatus of the present invention with a flywheel pre-form therein.
Figure 6:
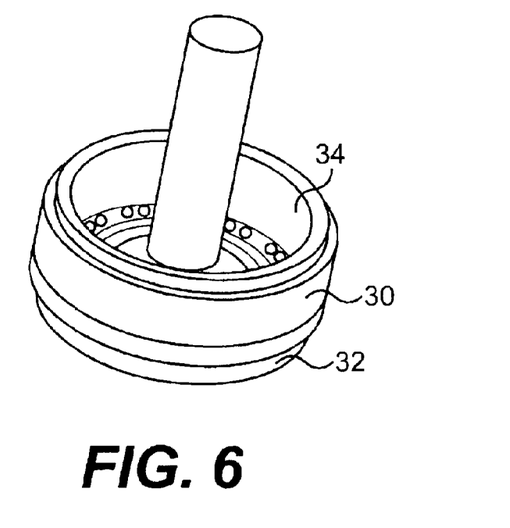
FIG. 6 is a perspective view of a portion of the inner cylinder showing a cam used for positioning the needles of the inner diameter knitting machine.

More particularly, flywheel pre-form 10 includes a spiral helix 12 of hoop fibers 15 as shown in FIG. 3. The spiral helix 12 of hoop fibers 15 can be provided to the flywheel pre-form 10 in any suitable manner such as by conical feed rollers 14 as shown in FIG. 2. The conical feed rollers 14 provide different lengths of hoop fibers 15 to the pre-form 10 to accommodate the difference in the diameter of the cylindrical pre-form 10 at different radial distances from the longitudinal axis.

The flywheel pre-form 10 of the invention also includes radial fibers 16 as shown in FIG. 3. In a preferred embodiment as shown in FIG. 3, radial fibers 16 are employed to form a helical structure within the helical structure 12 formed by the hoop fibers 15. This results in a double helical structure as shown in FIG. 3.

The radial fibers 16 can be laid down atop each ring of hoop fibers 15 to form a double helical structure as shown in FIG. 3 or a plurality of rings of hoop fibers 15 can be provided for each layer of radial fibers 16, depending on the properties desired of the final product. Also, multiple layers of radial fibers 16 can be provided between a single pair of rings of hoop fibers 15, if desired.

At the inner edge 22 and outer edge 24 of fiber pre-form 10, the hoop and radial fibers 15, 16 are knitted together by the action of the knitting machine 50 to secure the hoop and radial fibers 15, 16 in the pre-form 10. The knit may be in a jersey structure or it can incorporate miss, tuck, float or other suitable stitches in the fiber pre-form 10. Either the radial fibers 16 or catch cord 58 can do the stitching although it is preferred not to have the radial fibers 16 do the stitching.

The invention can be employed to make thick wall cylinder pre-forms 10 for use in flywheels and other applications. The key to the invention is the ability to place the hoop fibers 15 and radial fibers 16 down without introducing crimp into the fibers. Although the pre-forms 10 of the invention are described as a unitary helical coil, it will be understood that the flywheel may be constructed in laminated form from a plurality of such coils assembled in a stack and molded.

The fibers employed in the present invention may be made from any suitable material such as graphite, fiberglass, metal, polyaramids, or other suitable polymeric materials. Pre-impregnated fibers may also be employed. It may be desirable to employ two or more different types of hoop fibers 15 in a single flywheel. For example, relatively strong hoop fibers 15 may be located close to the inner edge 22 of the pre-form 10 and a mixture of strong and lower strength hoop fibers 15 may be distributed near the outer edge 24 of the pre-form 10. Relatively strong fibers are those having a tensile strength of about 525 KSI or higher. Generally, relatively stiff hoop fibers 15 are required near the inner edge 22 of the pre-form 10. Relatively stiff fibers typically have a tensile modulus of 33 MSI or higher. Radial fibers 16 should all be relatively strong.

Figure 1:
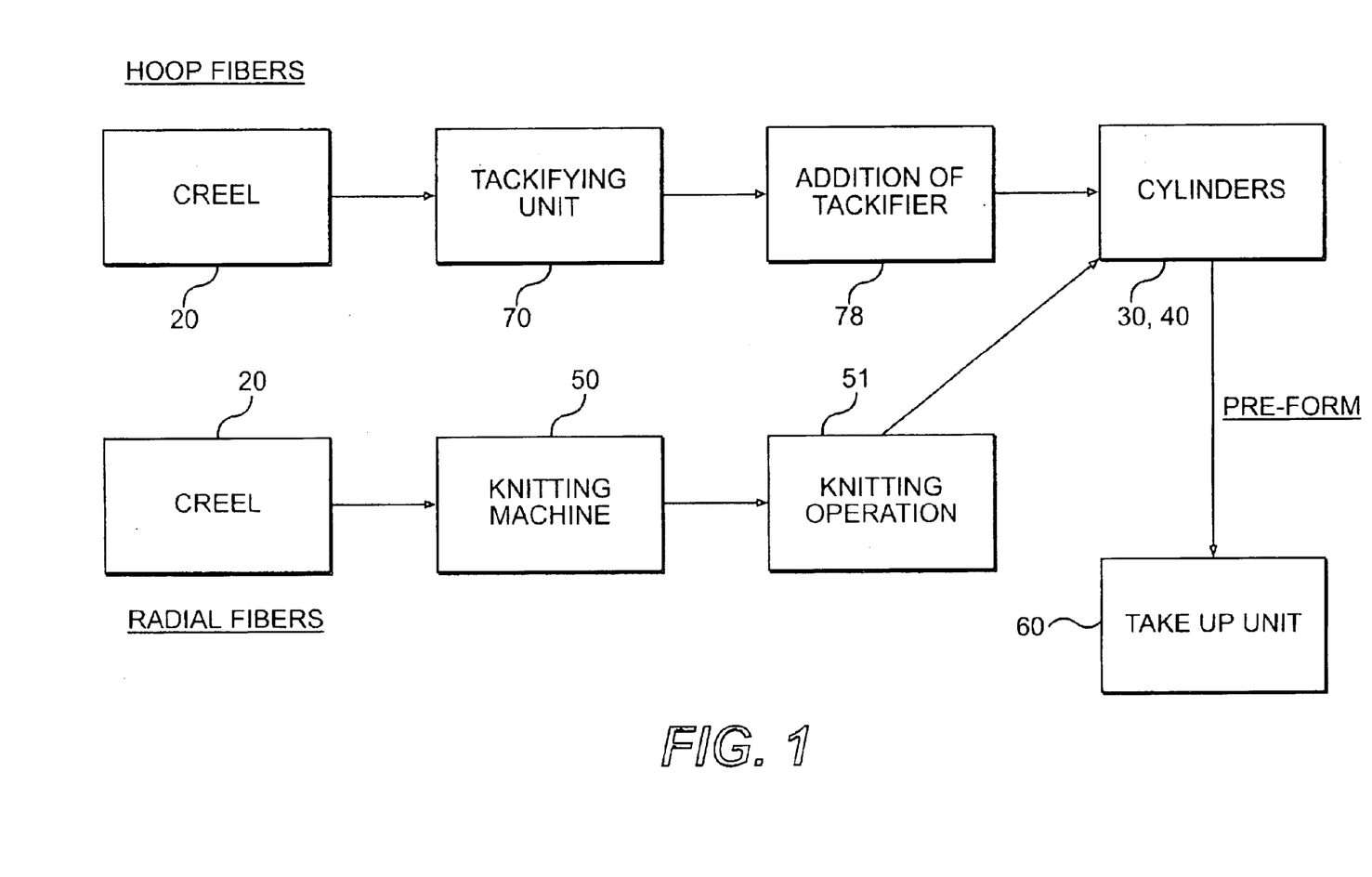
FIG. 1 is a schematic diagram of the flywheel pre-form manufacturing apparatus of the present invention.

The major components of a preferred manufacturing apparatus of the invention are shown schematically in FIG. 1 and include a creel 20, conical feed rollers 14 for feeding the hoop fibers 15, a knitting machine 50 for providing and knitting the radial fibers 16, and a take-up unit 60 to hold the finished pre-form 10.

A creel 20 is a stand to hold spools of fiber to feed the manufacturing apparatus. A preferred creel 20 for use in the present invention will include tension control and fiber break stop motion units. Any suitable, conventional creel 20 may be employed in the apparatus of the present invention. Each apparatus could have several feeds to increase the production rate, and each feed will need a creel 20 to feed the hoop fibers 15 to the conical feed rollers 14.

To place the hoop fibers 15 in place, a group of conical feed rollers 14 are employed. The purpose of the conical feed rollers 14 is to place a parallel group or sheet of hoop fibers 15 down in a circular formation. The length of fiber placed at the outer diameter is much longer than the fiber placed towards the inner diameter, therefore the rollers that feed the fibers to the pre-form 10 need to be conical to vary the length of fibers to accommodate this. The hoop fibers 15 are laid down in a circular formation, with the hoop fibers 15 running continuously from the bottom of the pre-form 10 to the top of the pre-form 10 in a spiral helix 12. Each feed on the machine for feeding hoop fibers 15 will need a group of conical feed rollers 14 to form the hoop fibers 15 in a circular shape. Each feed will lay down a layer of hoop fibers 15. Therefore by doubling the number of feeds it may be possible to double the production rate. The conical feed rollers 14 must be driven and timed to match the rotational speed of the inner and outer cylinders and/or the knitting head.

Figure 7:
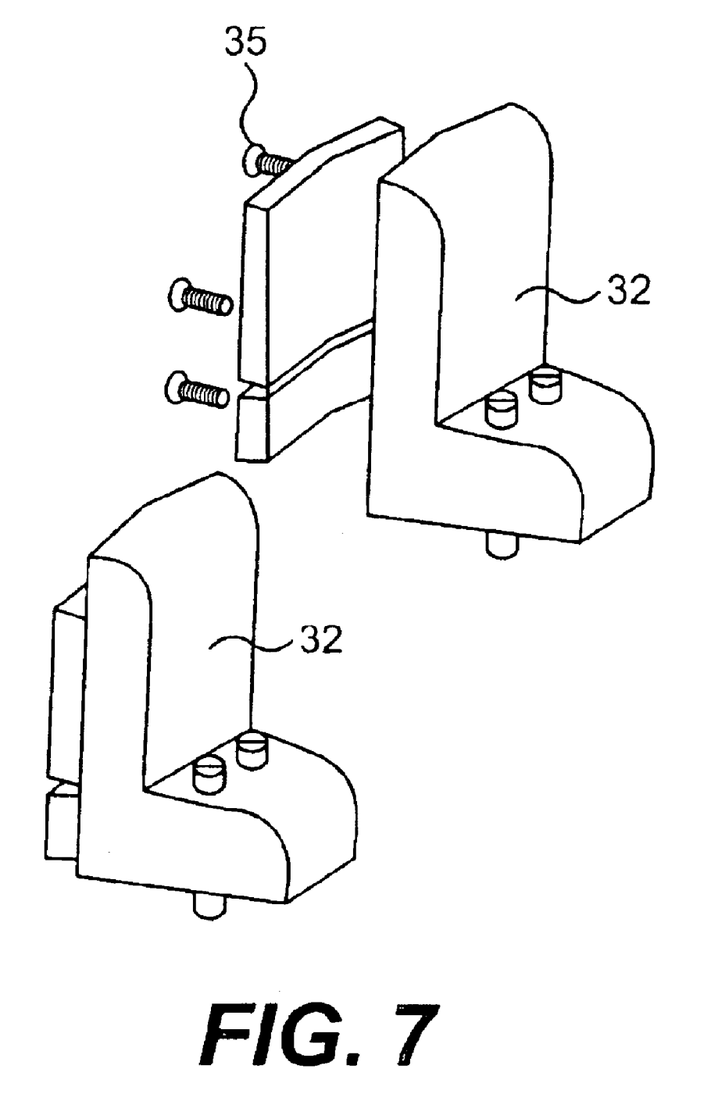
FIG. 7 is a perspective view of the two individual sections of the cam of FIG. 6.

Circular knitting machines are conventional, known machines which have been around for a hundred years. The circular knitting machine 50 of the present invention is built around the inner and outer cylinders 30, 40, with slots 32, 42 machined into the outside surface of the outer cylinder 40 and the inner surface of the inner cylinder 30. Latch needles 52 are placed into the slots 32, 42 and the depths of the slots 32, 42 are machined to allow the butts 54 of the latch needles 52 to protrude from the surfaces of the inner and outer cylinders 30, 40. The inner and outer cylinders 30, 40 and needles 52 rotate together to cause the butts 54 of the latch needles 52 interact with the cams 34, 44. The cams 34, 44 control the butts 54 of the latch needles 52 by virtue of the cam surfaces of the cams 34, 44 abutting with the butts 54 of latch needles 52 to thereby raise and lower the latch needles 52 as they rotate along with the inner and outer cylinders 30, 40. When a latch needle 52 is raised and a fiber feed is properly positioned, the latch needle 52 picks up the fiber as described in greater detail below. As shown in FIG. 7, the cams 34, 44 can be formed from individual parts that are affixed to the cylinders 30, 40 via screws 35.

The latch needles 52 can be raised and lowered in any number of ways, the cams 34, 44 being only one method of accomplishing this. Alternatively, the latch needles 52 could be provided with different lengths of the needle butts 54, the latch needles 52 can be expandable, the needle butts 54 can be in different position, or pattern wheels, pattern drums, electronic needle selection or full jacquard selection can be used.

Also, the knitting machine 50 need not employ latch needles 52, although they are preferred. Other types of needles such as bearded or compound needles can be employed, although some minor modifications may need to be made to the manufacturing apparatus and/or method to accommodate such other needles.

The knitting machine 50 includes two knitting units, one associated with the inner cylinder 30 and the other associated with the outer cylinder 40. The knitting unit associated with the inner cylinder 30 is inverted relative to the knitting unit associated with the outer cylinder 40. The inner and outer cylinders 30, 40 preferably each have the same number of latch needles 52 associated therewith, though this need not be the case. The inner and outer cylinders 30, 40 are rotated at substantially the same rotational speed in order to maintain proper alignment of the latch needles 52 for the knitting operation 51. The latch needles 52 hold the radial fibers 16 in place during the knitting operation 51.

The knitting machine 50 also includes a radial fiber guide 56 that travels back and forth between the latch needles 52 associated with the inner and outer cylinders 30, 40 to insert the radial fibers 16 into the latch needles 52. The radial fiber guide 56 should be able to travel in a straight line from the latch needle 52 associated with the inner cylinder 30 to the corresponding latch needle 52 associated with the outer cylinder 40 and the rotation of the inner and outer cylinders 30, 40 moves the latch needles 52 to and from the radial fiber guide 56 as described above. The radial fiber guide 56 places, or lays in, the radial fibers 16 in a radial direction, relative to the pre-form 10, from a latch needle 52 associated with the inner cylinder 30 to the corresponding latch needle 52 associated with the outer cylinder 40. The knitting action holds the radial fibers 16 in place.

Figure 8:
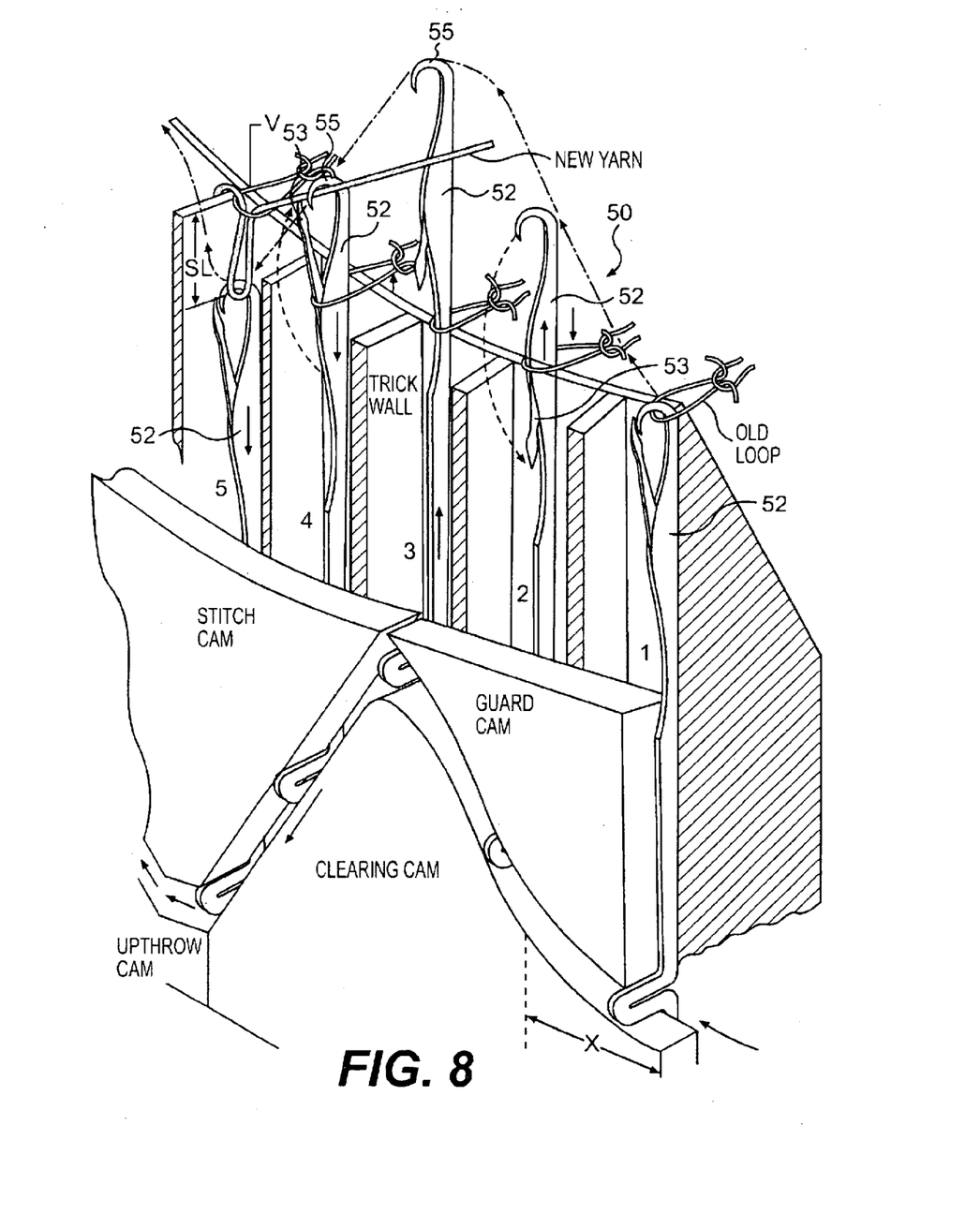
FIG. 8 is a partial cross-sectional view of a knitting machine and outer cylinder suitable for use in the manufacturing process of the present invention and which shows the five steps of a suitable knitting method.
Figure 9:
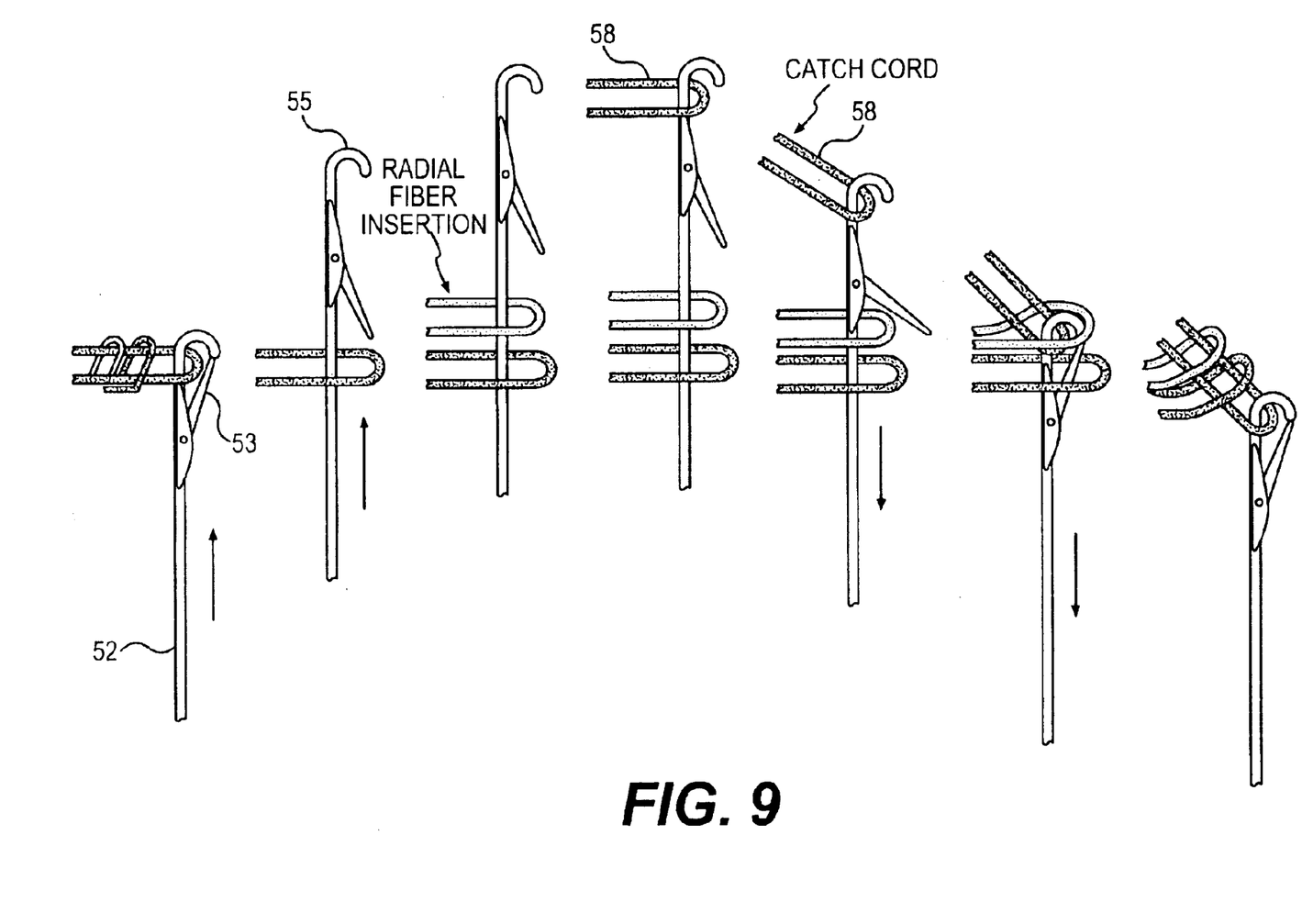
FIG. 9 is a diagram showing the steps of the knitting process used to provide the radial fibers to the pre-form.
Figure 10:
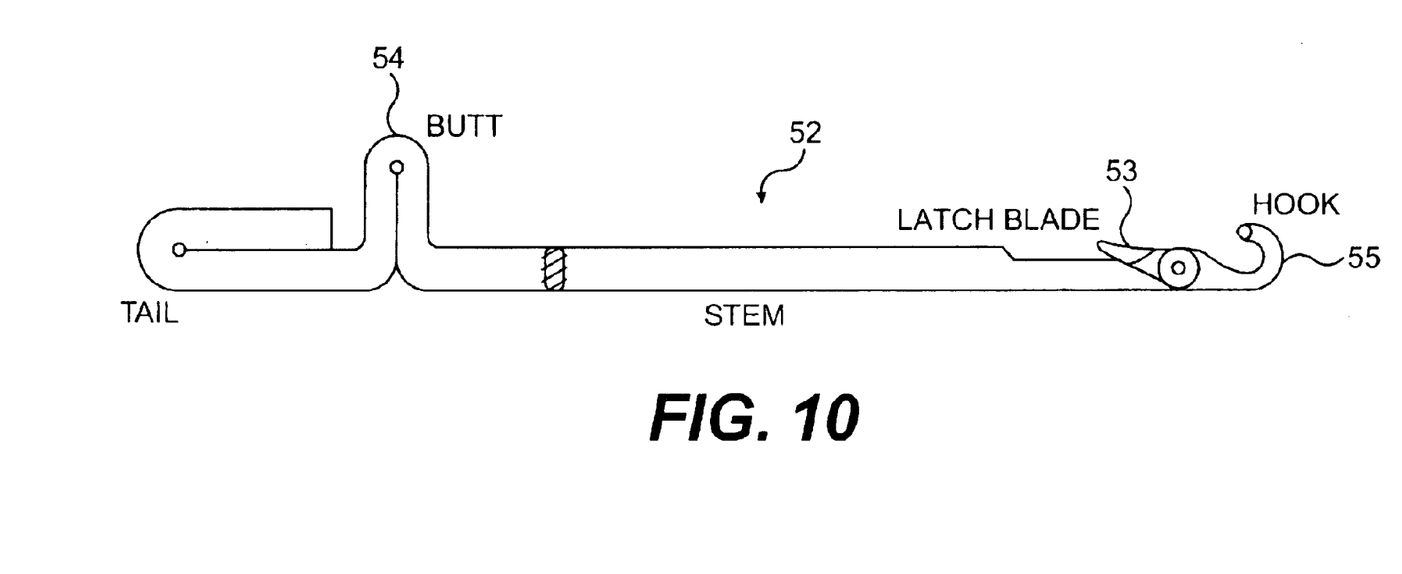
FIG. 10 is perspective view of a latch needle for the knitting machine.

Referring to FIGS. 8–9, the steps for placing the radial fibers 16 are as follows. First, the inner and outer cylinders 30, 40 must be rotated at the same rotational speed. Then, as the cylinders 30, 40 are rotating, the cams 34, 44 push the butts 54 of latch needles 52 up to expose the latch 53 and hook 55 of the latch needle 52 above the inner and outer cylinders 30, 40. As the latch needles 52 rise, the radial fiber guide 56 travels from the outer cylinder 40 between latch needles 52a and 52b associated with the inner cylinder 30. The radial fibers 16 are wrapped around the stem of the latch needle 52b by reversing the travel direction of the radial fiber guide 56. Once the direction of the radial fiber guide 56 has been reversed, it then travels between latch needles 52b, 52c thereby wrapping the radial fibers 16 around the stem of latch needle 52b. The radial fiber guide 56 then travels across the hoop fibers and between two latch needles 52d, 52e associated with the outer cylinder 40. Finally, the radial fiber 16 is wrapped around the stem of the latch needle 52e, by reversing the direction of travel of the radial fiber guide 56 such that the radial fiber guide 56 travels between latch needles 52e and 52f. From this point, the knitting process repeats itself until the pre-form 10 is completed.

The take-up unit 60 is preferably rotated at the same rotational speed as the inner and outer cylinders 30, 40. The bottom of the take-up unit 60 moves downwardly away from the top of the manufacturing apparatus at a rate comparable to the build up of the pre-form 10. Thus, for each revolution of the cylinders 30, 40 a certain thickness of material is added to the pre-form 10 and the take-up unit 60 moves downwardly away a sufficient distance to compensate for the added thickness of the pre-form 10. Conventional take-up units 60 for spiral winding apparatus may be employed in the manufacturing apparatus and method of the present invention.

Finally, the manufacturing apparatus of the present invention may optionally include a tackifying unit 70 for feeding a tackifier 78. Tackifiers 78 are conventional in flywheel manufacture and are commercially available and relatively inexpensive. The tackifier 78 is generally in the form of a powder and the tackifying unit 70 preferably distributes the tackifier 78 substantially uniformly on the pre-form 10 at various times during the manufacturing process. After the tackifier 78 is deposited onto the pre-form 10, heat is applied to make the tackifier 78 tacky to cause the next layer of hoop or radial fibers 15, 16 to stick to it. Preferably, a tackifying unit 70 is associated with each fiber feed unit to help hold the hoop fibers 15 in place. The heaters 72 used in the apparatus of the present invention are preferably infrared heaters, although any other suitable, conventional type of heater may be employed.

As an alternative to, or in addition to the tackifying unit 70, the manufacturing apparatus may further include another set of hold down rollers 62 to mechanically hold the hoop and/or radial fibers 15, 16 in place after they are added to the pre-form 10. These additional hold down rollers 62 function to compact the pre-form 10 to provide a better product. More preferably, the additional hold down rollers 62 are also conical rollers and are similar to but smaller than the conical feed rollers 14 employed to feed the hoop fibers 15 to the manufacturing apparatus. The preferred conical hold down rollers 62 for holding the fibers 15, 16 in place would have the same ratio of the diameter of the roller at one end to the diameter of the roller at the other end as for the conical feed rollers 14. Since the fibers 15, 16 would contact the hold down rollers 62 only at tangent points, it is also preferable to use a plurality of smaller hold down rollers 62 for mechanically holding the fibers 15, 16 in place in order to maximize the contact between the hold down rollers 62 and fibers 15, 16. The hold down rollers 62 are preferably driven in the same manner as the conical feed rollers 14.

The operation of the preferred manufacturing apparatus of the present invention includes essentially four steps: tackification, hoop fiber insertion, radial fiber insertion, and take-up. The first operation is to coat the top of the previous layer of fibers with tackifier 78, about 5% by weight, based on the weight of the fibers. The tackified material travels under a small group of heaters 72 just before it goes under the conical feed rollers 14. The conical feed rollers 14 then feed a layer of hoop fibers 15 on top of the heated tackifier 78. The pressure of the conical feed rollers 14 bonds the hoop fibers 15 to the heated tackifier 78 on top of the previous layer. After securing the hoop fibers 15 in this manner, the next step is the radial fiber insertion step. The inner and outer cams 34, 44 control the needle butts 54 to raise the latch needles 52 such that the latches 53 and hooks 55 are above the top of the pre-form 10. The radial fiber guide 56 then wraps the radial fibers 16 around the stems of the latch needles 52 as described above. After the radial fibers 16 are wrapped around the latch needles 52, a catch cord 58 is latched by the hook 53 of a latch needle 52 associated with the outer cylinder 40. The cam 44 then causes the latch needle 52 to move downwardly to interloop the catch cord 58, thereby securing the radial fiber 16 in place at the outer edge 24 of pre-form 10. As the latch needle 52 is knitting the catch cord 58, the radial fiber guide 56 wraps the next radial fiber 16 around the shaft of the next latch needle 52 associated with the inner cylinder 30 and a catch cord 58 associated with the inner cylinder 30 is hooked by the hook 53 of the latch needle 52. The cam 24 then causes the latch needle 52 to move downwardly to interloop the catch cord 58, thereby securing the radial fiber 16 at the inner edge 22 of the pre-form 10. The radial fiber guide 56 then repeats the process.

The final operation in the manufacturing process is the take-up which collects the completed portion of the pre-form 10 and moves the pre-form 10 away from the fiber insertion points to create more room for addition of the next layer of fibers to the pre-form 10. Each unit tackifying, hoop insertion, and radial fiber insertion) lays down one layer of material for each cylinder revolution. Therefore, if the manufacturing apparatus includes four fiber insertion points, every revolution of the inner and outer cylinders 30, 40 results in four layers of fibers being laid down.

In an alternative embodiment which is particularly suitable for making carbon-carbon brakes for airliners, a needle punch machine may be employed to place fibers in the axial or radial directions and the tackifier may be partially or completely omitted. In this embodiment, the needle punch machine employs an array of barbed needles to penetrate the pre-form and push fibers down into the previous fiber layers in order to secure the new fibers to the previous fiber layers. Conventional needle punch machines may be employed for this purpose.

The foregoing description of the invention has been presented for the purpose of illustration and description only and is not intended to limit the scope of the invention in any way. The scope of the invention is to be determined from the claims appended hereto.

What is claimed is:

1. A method for the production of a modified composite flywheel pre-form comprising the steps of:

feeding a pre-form a tackifying unit;

said tackifying unit applying, a tackifying material to said pre-form to form a tackified pre-form;

contacting a layer of hoop fibers with said tackified pre-form to attached said layer of hoop fibers to said tackified pre-form;

and knitting a plurality of radial fibers to said layer of hoop fibers to form the modified pre-form.

2. A modified composite flywheel pre-form produced by the method of claim 1.

3. A method as claimed in claim 1, wherein said radial fibers are knitted to said tackified pre-form layer of hoop fibers without crimping the radial fibers.

4. A method as claimed in claim 3, further wherein at least two layers of radial fibers are knitted into said modified pre-form.

5. A method as claimed in claim 4, wherein at least two layers of hoop fibers are included in said modified pre-form.

6. A method as claimed in claim 5, wherein said modified pre-form includes one layer of radial fibers for each layer of hoop fibers.

7. A method as claimed in claim 6, wherein said modified pre-form includes more layers of hoop fibers than layers of radial fibers.

8. A modified composite flywheel pre-form produced by the method of claim 3.

9. A modified composite flywheel pre-form produced by the method of claim 4.

10. A modified composite flywheel pre-form produced by the method of claim 5.

11. A modified composite flywheel pre-form produced by the method of claim 6.

12. A modified composite flywheel pre-form produced by the method of claim 7.

* * * * *